Sept. 6, 1932.　　　　G. W. BRITTON　　　　1,876,508
PROP
Filed Jan. 30, 1931
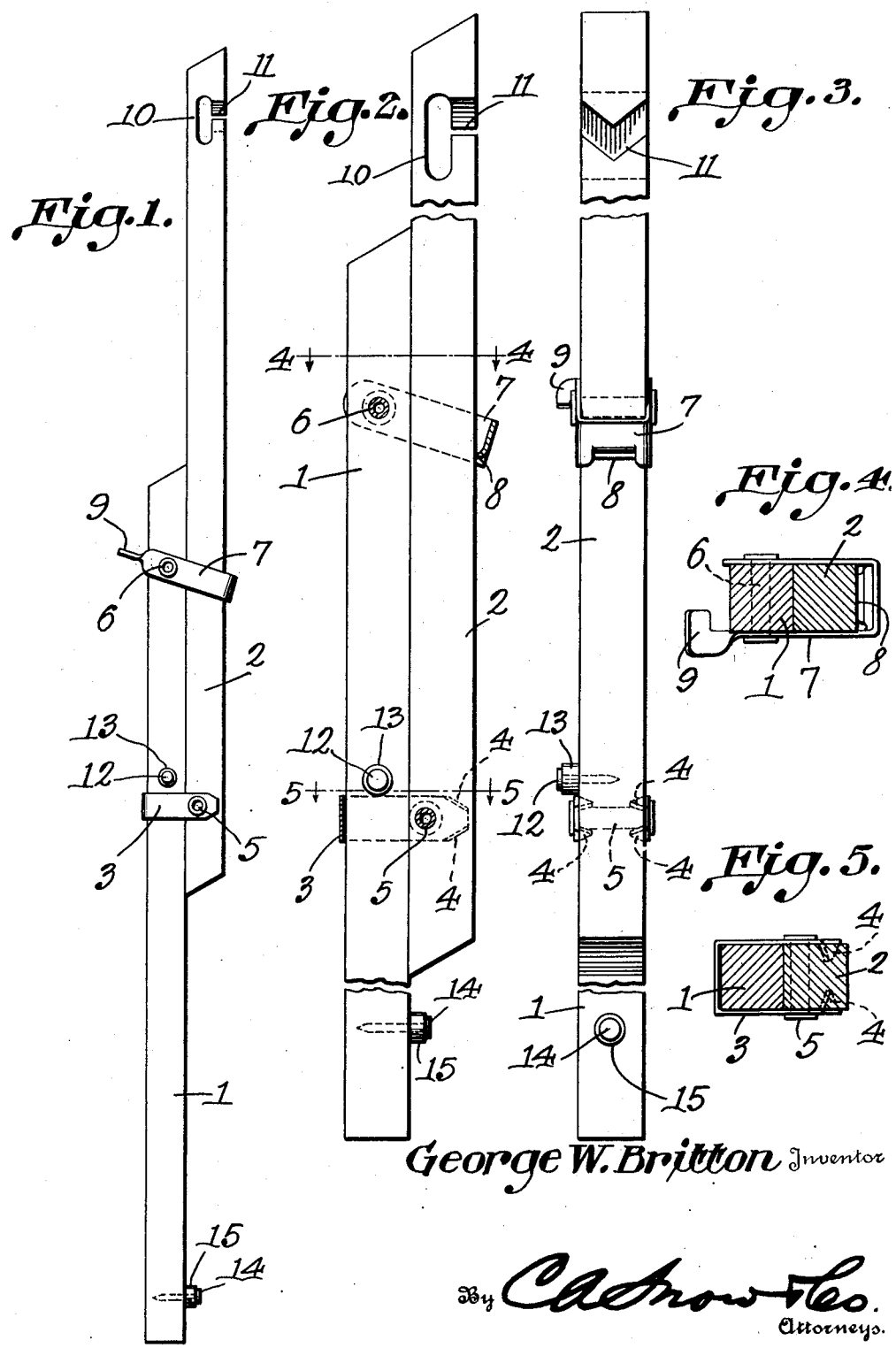
George W. Britton, Inventor
By CA Snow &Co.
Attorneys.

Patented Sept. 6, 1932

1,876,508

UNITED STATES PATENT OFFICE

GEORGE W. BRITTON, OF CAMDEN, NEW JERSEY

PROP

Application filed January 30, 1931. Serial No. 512,409.

This invention relates to a prop for use primarily in connection with clothes lines, one of the objects being to provide a prop which can be readily connected to or disconnected from the line and has simple and efficient means permitting longitudinal adjustment of the prop, said means serving to hold the members of the prop against relative movement under normal conditions following the adjustment.

A still further object is to provide a structure of this character which is formed of few parts and can be assembled and sold at low cost.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawing, the preferred form of the invention has been shown.

In said drawing:

Figure 1 is a side elevation of the prop.

Figure 2 is an enlarged side elevation with parts broken away and showing the guide and coupling members in section.

Figure 3 is a front elevation of the structure shown in Figure 2.

Figure 4 is a section on line 4—4, Figure 2.

Figure 5 is a section on line 5—5, Figure 2.

Referring to the figures by characters of reference, 1 and 2 designate the upper and lower members of the prop each being formed preferably of an elongated strip of wood rectangular in cross section. To the lower end portion of the member 2 is attached an angular yoke 3 the corner portions 4 of which are bent diagonally to form teeth or prongs which are adapted to be driven into opposed faces of the member 2 thereby to hold the yoke perpendicular to said member. A rivet 5 or the like can be extended entirely through the member 2 and the end portions of the yoke for the purpose of holding them together positively.

A rivet 6 is extended through the upper end portion of the member 1 and is pivotally engaged by a coupling yoke 7 also angular and having the lower edge of its intermediate portion offset inwardly toward the rivet 6 to form a lip 8 which is adapted to frictionally engage the adjacent surface of the member 2.

If desired one arm of the yoke 7 can be formed with a finger piece 9 whereby the lip 8 can be swung upwardly out of engagement with the member 2. This finger piece is not essential but can be dispensed with.

Formed in the upper end portion of the member 2 is a transverse slot 10 parallel with opposed longitudinal faces of said member and one wall of this slot is intersected by a V-shaped slot 11 opening through one of the faces of the member 2.

Extending from the member 1 between the yokes 3 and 7 is a pin 12 on which may be mounted a roller 13 constituting a wear-sleeve, and another pin 14 or the like is extended from the member 1 below and in the path of the member 2 and is also provided with a roller or wear-sleeve. It is to be understood, however, that these pins can be of any shape desired and the wear-sleeves need not be used.

In practice the clothes line to be supported is crimped so as to be inserted laterally through the V-shaped slot 11 into the slot 10 after which it will straighten out and can not be disengaged from the prop unless again crimped and pressed outwardly through the slot 11. The member 2 is slid upwardly relative to the member 1, the yokes 3 and 7 constituting guides. After said member has been shifted to a desired point it is released and the yoke 7 will swing downwardly by gravity so as to cause lip 8 to engage and press tightly against member 2. Thus the member 2 will be supported against free downward movement and cannot be lowered until after lip 8 has been swung upwardly from engagement therewith. The pins 12 and 14 with the wear-sleeves thereon limit the relative movement of the prop members and prevent them from becoming separated.

This prop can be adjusted to any desired length and, when not in use, it can be hung on a rack in a kitchen or laundry without being objectionable in appearance. If the prop is supporting a line carrying fabrics and a strong wind blows against them, the prop will elongate automatically to lift the line higher and render it more taut.

What is claimed is:

A prop including upper and lower parallel members, a yoke pivotally connected at one end to the upper end portion of the lower member, an inturned lip on the lower edge of the yoke normally held by gravity in gripping engagement with the upper member to hold said upper member against downward sliding movement, a finger piece integral with that end of the yoke remote from the lip and overbalanced by the lip end of the yoke, said finger piece being depressible toward the bottom of the prop to disengage the lip from the prop, a yoke straddling the lower portion of the upper member, prongs integral therewith and seated in said member for holding the yoke stationary to said member, a transverse rivet in the upper member for holding the prongs in engagement therewith, stop pins on the lower member above and below the pronged yoke for limiting the sliding movement of the upper member in both directions relative to the lower member, and wear devices on the pins.

In testimony that I claim the foregoing as my own, I have hereto affixed my signature.

GEORGE W. BRITTON.